US010810186B2

(12) United States Patent
Kaneda et al.

(10) Patent No.: US 10,810,186 B2
(45) Date of Patent: Oct. 20, 2020

(54) DEVICE MANAGEMENT DEVICE, AND RECORDING MEDIUM STORING A DEVICE MANAGEMENT PROGRAM

(71) Applicant: SEIKO EPSON CORPORATION, Tokyo (JP)

(72) Inventors: Michiaki Kaneda, Sagamihara (JP); Takashi Sera, Shiojiri (JP); Yusuke Nakajima, Hino (JP); Shingo Saito, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 559 days.

(21) Appl. No.: 15/701,129

(22) Filed: Sep. 11, 2017

(65) Prior Publication Data

US 2018/0075088 A1    Mar. 15, 2018

(30) Foreign Application Priority Data

Sep. 15, 2016   (JP) ................. 2016-180753

(51) Int. Cl.
*G06F 16/23*  (2019.01)
*G06F 16/21*  (2019.01)
*G06F 16/27*  (2019.01)

(52) U.S. Cl.
CPC ........ *G06F 16/2379* (2019.01); *G06F 16/217* (2019.01); *G06F 16/2343* (2019.01); *G06F 16/27* (2019.01)

(58) Field of Classification Search
CPC .. G06F 16/2379; G06F 16/2386; G06F 16/27; G06F 16/273; G06F 16/275
See application file for complete search history.

(56) References Cited

U.S. PATENT DOCUMENTS

| 6,078,982 A | 6/2000 | Du et al. |
| 7,929,166 B2 | 4/2011 | Nagasawa |
| 8,386,798 B2 | 2/2013 | Dodgson et al. |
| 9,420,435 B2 | 8/2016 | Kim et al. |
| 2008/0030817 A1 | 2/2008 | Nagasawa |
| 2013/0060853 A1 | 3/2013 | Kim et al. |

FOREIGN PATENT DOCUMENTS

| CN | 102576360 A | 7/2012 |
| CN | 102968430 A | 3/2013 |
| JP | 2008-026961 | 2/2008 |
| JP | 2010-199671 | 9/2010 |
| WO | 2003/073292 | 9/2003 |

OTHER PUBLICATIONS

European Search Report issued in EP 17191204 dated Nov. 8, 2017.

*Primary Examiner* — William Spieler
(74) *Attorney, Agent, or Firm* — Workman Nydegger (57) ABSTRACT

Updating a database is accelerated. A device management device manages a device having a database, and includes: an acquisition unit configured to acquire database state information from the device; and an updating unit configured to send update data for updating the database to the device, and cause the device to update the database based on the update data. The updating unit selectively executes, based on the database state information, a first updating process of sequentially sending the updated portions of the update data to the device to change the updated portions of the database; or a second updating process of sending all of the update data to the device to refresh the complete database.

8 Claims, 5 Drawing Sheets

```
{
  "ContactTable" : [
    {
      "Name" : "YAMADA TARO",
      "IndexWord" : "Yamada Taro",
      "Address" : "YamadaTaro@example.com",
      "InfoType" : "email",
      "Param1" : "RELATIVE",
      "Param2" : "",
      "Param3" : ""
    },
    {
      "Name" : "XX CORPORATION",
      "IndexWord" : "XX Kogyo",
      "Address" : "0120-000-000",
      "InfoType" : "fax",
      "Param1" : "WORK",
      "Param2" : "CUSTOMER",
      "Param3" : "IMPORTANT"
    },
    {
      "Name" : "OFFICE PC",
      "IndexWord" : "JimusyoPC",
      "Address" : "¥¥Jimusyo001¥Shared",
      "InfoType" : "folder",
      "Param1" : "WORK",
      "Param2" : "INVOICE STORAGE DIRECTORY",
      "Param3" : ""
    }
    {
      "Name" : "John Doe",
      "IndexWord" : "John Doe",
      "Address" : "JohnDoe@international.com",
      "InfoType" : "email",
      "Param1" : "FRIEND",
      "Param2" : "",
      "Param3" : ""
    }
  ]
}
```
— 27

DEVICE MANAGEMENT DEVICE, AND RECORDING MEDIUM STORING A DEVICE MANAGEMENT PROGRAM

BACKGROUND

1. Technical Field

The present invention relates to a device management device, and a recording medium storing a device management program.

2. Related Art

Updating databases stored by devices may be necessary.

As a related technology, JP-A-2010-199671 describes an address book management device that runs an address book manager application configured to extract the fax number of the sender and the name of the addressee from e-mail messages received through an e-mail program, and registers the fax number and addressee in the address book of the fax machine.

Faster updating of the database was required.

The invention is directed to the foregoing problem, and provides a device management device, and a recording medium storing a device management program, that contribute to updating a database more quickly.

SUMMARY

One aspect of the invention is a device management device that manages a device having a database, including: an acquisition unit configured to acquire database state information from the device; and an updating unit configured to send update data for updating the database to the device, and cause the device to update the database based on the update data. The updating unit selectively executes, based on the database state information, a first updating process of sequentially sending the updated portions of the update data to the device to change the updated portions of the database, or a second updating process of sending all of the update data to the device to refresh the complete database.

Thus comprised, when executing the second updating process is selected based on the database state information, the updating unit overwrites the entire database by sending all updated data to the device, and can therefore update the database quickly (in a short time) by the updating method most appropriate to the state of the database.

In another aspect of the invention, the updating unit determines, based on the database state information, if at least one field of the database is locked; executes the first updating process to change fields of the database that are not locked based on the updated portions if at least one field of the database is locked; and executes the second updating process if no field of the database is locked.

When there are no locked fields in the database, this configuration enables quickly updating the database by executing the second updating process.

In another aspect of the invention, the database is an address book containing multiple addresses of data transmission destinations, and the address set as the destination of the data transmission function of the device may be the locked field of the database.

When an address set as the destination to which data is sent by the data transmission function of the device is stored in an address book (database), this configuration avoids disrupting the data transmission function of the device by updating the entire database.

In another aspect of the invention, the updating unit determines if the device is compatible with a specific protocol used for transmission for the second updating process, and if the device is compatible with the specific protocol, selects executing the first updating process or second updating process based on the database state information.

By the updating unit first determining if the device is compatible with a specific protocol used for communication in the second updating process, this configuration prevents unnecessarily selecting the updating process based on database state information.

The updating unit may use SNMP (Simple Network Management Protocol) for communication for the first updating process, and HTTP (Hyper Text Transfer Protocol) for communication for the second updating process, for example.

In another aspect of the invention, the device management device also has an update data generator configured to generate the update data. The acquisition unit acquires the database from the device; and the update data generator displays the acquired database in a specific screen, receives edits of the database, and generates the update data according to the received edits.

This configuration enables easily receiving database edits from the user, and reflecting the received edits in the updated database.

In another aspect of the invention, the update data generator stores, without reflecting in the update data, the content of edits of a locked field, which is the portion of the database determined to be locked based on the database state information; and when a locked field of the database is determined to have been unlocked based on new database state information acquired by the acquisition unit from the device after edited content was stored, externally reports that edited content of the locked field is stored.

This configuration stores edited content that the user input intending to edit the database but which was not reflected in the updated database, and then informing the user when using that edited content in the database becomes possible.

The technical concept of the invention is not limited to the category of a device management device, and may also be expressed as a method (device management method) including the processes and steps executed the device management device, and as a program causing a computer to execute these processes and steps. The invention may also be configured as a system including a device management device and a device, and as a device that is managed by the device management device.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures. The figures show examples convenient for describing the invention, and the invention is obviously not limited thereby.

1. System Summary

Figure 1:
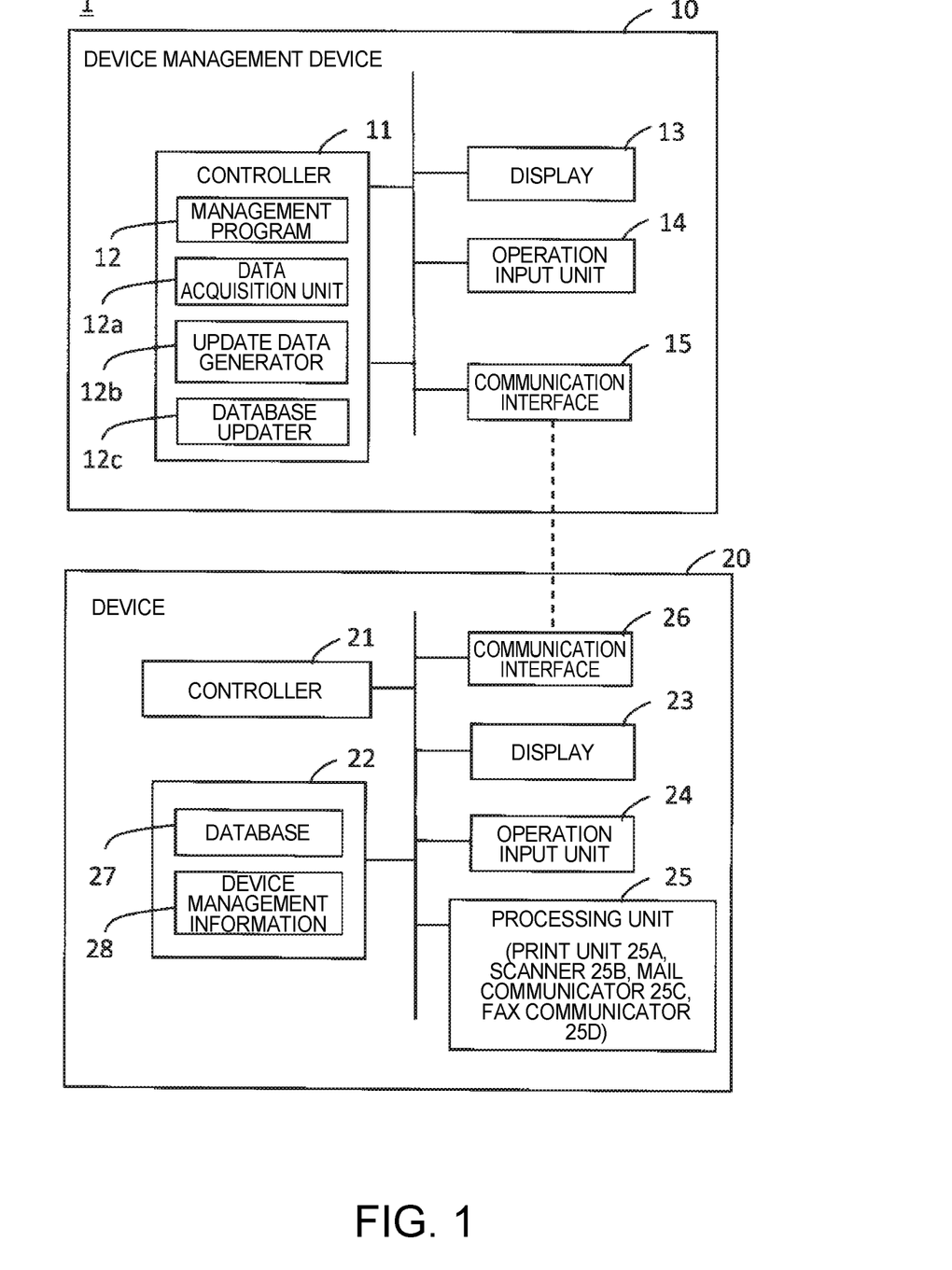
FIG. 1 is a block diagram illustrating the configuration of a system according to the invention.

FIG. 1 is a block diagram illustrating important configurations in a system 1 according to this embodiment of the invention. This system 1 may be referred to as a device management system, or a database management system, for example. The system 1 includes a device 20 and a device management device 10 that manages the device 20.

The device 20 is a device storing a database 27 that may be updated. The device 20 may be, for example, a multifunction device including multiple functions such as a printing capability, scanning capability, fax transmission capability, and e-mail communication capability. The device 20 may therefore also be referred to as a printer, a scanner, a fax machine, or a communication device.

The device management device 10 may be embodied by, for example, a server, a personal computer (PC), a smartphone, a tablet computer, or a cell phone. The device management device 10 and device 20 of the system 1 are connected to communicate by wire or wirelessly. The device management device 10 and device 20 may connect through a network (such as the Internet or a LAN).

In the example in FIG. 1, the device management device 10 includes a controller 11, display 13, and operation input unit 14.

The controller 11 is configured with IC devices including a CPU, ROM, RAM, or other type of memory media. In the controller 11, the CPU executes operating processes according to a program (such as a management program 12) stored in ROM, for example, using RAM or other working memory. The device management device 10 also has a communication interface 15. The communication interface 15 is compatible with communication standards for communicating with external devices (such as devices 20), and is connected to devices 20 through a LAN or other network, for example.

The controller 11 embodies the functions of a data acquisition unit 12a, update data generator 12b, and database updater 12c by means of the CPU running the management program 12.

The display 13 is a means for visually presenting information, and may be an LCD panel, OLED display panel, or other. The display 13 may be a configuration combining a display and a drive circuit for driving the display.

The operation input unit 14 is a means for receiving user operations, and may be embodied by physical buttons, a touch panel, a mouse, or a keyboard, for example. If a touch panel, the operation input unit 14 may also embody the function of the display 13. The display 13 and operation input unit 14 may also be collectively referred to as an operating panel, for example.

The device 20 has a controller 21, storage 22, display 23, operation input unit 24, and processing unit 25.

The controller 21 is configured with IC devices including a CPU, ROM, RAM, or other type of memory media. In the controller 21, the CPU executes operating processes according to a program stored in ROM, for example, using RAM or other working memory.

A database 27 and device management information 28 are stored in the storage 22. The storage 22 may be part of the controller 21.

The display 23 and operation input unit 24 may be embodied in the same way as the display 13 and operation input unit 14.

The device 20 also has a communication interface 26 compatible with communication standards for communicating with external devices (such as the device management device 10).

The processing unit 25 is the generic term for a configuration that specifically embodies the functions of the device 20. For example, the processing unit 25 may include various mechanisms and configurations (configurations including software applications), such as a print unit 25a that prints on print media according to print commands from an external device; a scanner 25b that optically reads a document and generates a read result (image data); a fax communicator 25d that sends and receives facsimiles; and a mail communicator 25c that sends and receives e-mail.

Note that while not shown in FIG. 1, a device that connects to the communication interface 15 of the device management device 10 is obviously not limited to the single unit (single device 20) shown in the figure. It will also be obvious that the device 20 may communicatively connect through the communication interface 26 to external devices other than the device management device 10 (such as a personal computer or fax machine).

2. Database Acquisition Process

Figure 2:
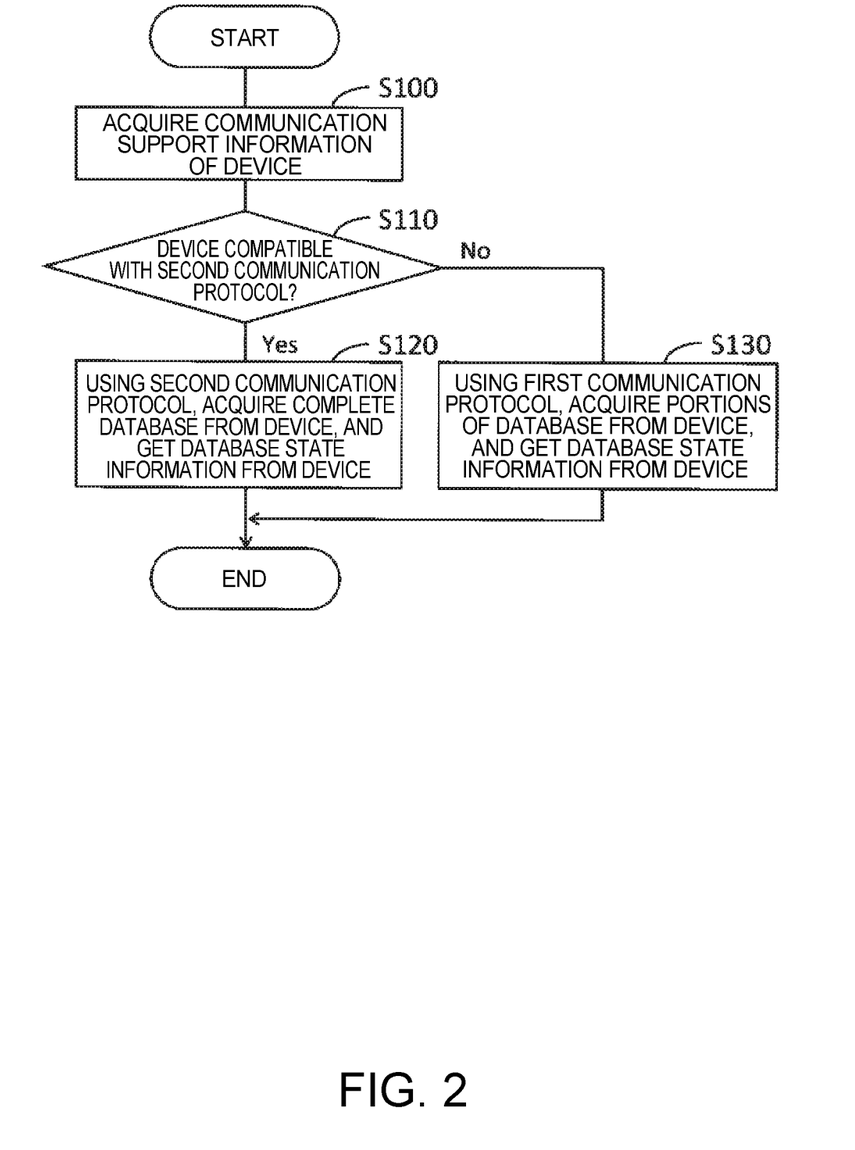
FIG. 2 is a flow chart of a database acquisition process.

FIG. 2 is a flow chart of the database acquisition process executed by the controller 11 running the management program 12.

When the database acquisition process starts, the controller 11 has already identified the external device for which to acquire the database. For example, the controller 11 displays a specific user interface on the display 13. The controller 11 then receives the selection of the device for which to acquire the database. The device is selected from among the devices the device management device 10 can currently recognize through the communication interface 15 by a user operation through the user interface (an operation using the operation input unit 14). In this example, the controller 11 thereby identifies the device 20 as the device for which to acquire the database.

In step S100, the controller 11 (data acquisition unit 12a) acquires communication support information from the device (in this example, device 20) identified as the device from which to acquire the database. The communication support information includes at least information indicating the communication protocol used by the device 20. In this example, when a particular communication protocol is referred to as the first communication protocol, a protocol enabling communicating a large amount of data in a shorter time than the first communication protocol is referred to as a second communication protocol. For example, if the first communication protocol is SNMP (Simple Network Management Protocol), an example of a second communication protocol is HTTP (Hyper Text Transfer Protocol). SNMP is a protocol for managing by an SNMP manager devices (SNMP agents) connected to a TCP/IP (Transmission Control Protocol/Internet Protocol) network.

This embodiment supposes that the device management device 10 is a communication device that is compatible with both the first communication protocol and second communication protocol. The device 20 is a communication device that is compatible with at least the first communication protocol. Therefore, the communication support information is information indicating whether or not the device 20 is compatible with the second communication protocol.

In step S100, the data acquisition unit 12*a* requests communication support information from the device 20 through the communication interface 15 by communication using the first communication protocol.

The communication support information is, for example, information contained in a MIB (Management Information Base). An MIB is the device information belonging to an SNMP agent (device 20 in this example), and is an information group that can be accessed by a unit called an object. The device management information 28 stored in storage 22 may be considered such an MIB. In response to the request, the device 20 sends its communication support information through the communication interface 26 using the first communication protocol to the SNMP manager (the device management device 10 in this example) that sent the request. As a result, the data acquisition unit 12*a* can acquire the communication support information of the device 20.

The communication support information is, for example, a flag indicating whether or not the device 20 is compatible with the second communication protocol. Alternatively, the communication support information may include a specific URL (Uniform Resource Locator) written in the MIB. The URL identifies the location of the database 27 the device management device 10 can access by HTTP (second communication protocol) to acquire the database 27 of the device 20. Therefore, if such a URL is contained in the communication support information, the device 20 can be considered compatible with the second communication protocol.

In step S110, the data acquisition unit 12*a*, based on the communication support information acquired in step S100, determines if the device 20 is compatible with the second communication protocol. If the device 20 is compatible with the second communication protocol (step S110: Yes), the data acquisition unit 12*a* goes to step S120. If the device 20 is not compatible with the second communication protocol (step S110: No), the data acquisition unit 12*a* goes to step S130.

In step S120, the data acquisition unit 12*a* communicates with the device 20 through the communication interface 15 using the second communication protocol, and acquires the entire database 27 stored by the device 20. In this event, the data acquisition unit 12*a* functions as a browser using HTTP, for example, connects to the device 20 identified by the URL, and sends a command (Get method) for acquiring the database 27. In response to the command, the device 20 sends to the device management device 10 an HTML file (Hyper Text Markup Language) expressing the database 27. As a result, the data acquisition unit 12*a* can acquire the complete database 27 of the device 20.

The database 27 of the device 20 is, for example, an address book storing multiple addresses (contacts) to which information may be sent. The address to which information is sent may be, for example, an e-mail address, a fax number, or the path to a folder (directory) reserved on a storage medium of another type of external device. The address book may also be referred to as an address directory or contact list, for example.

Figure 3:
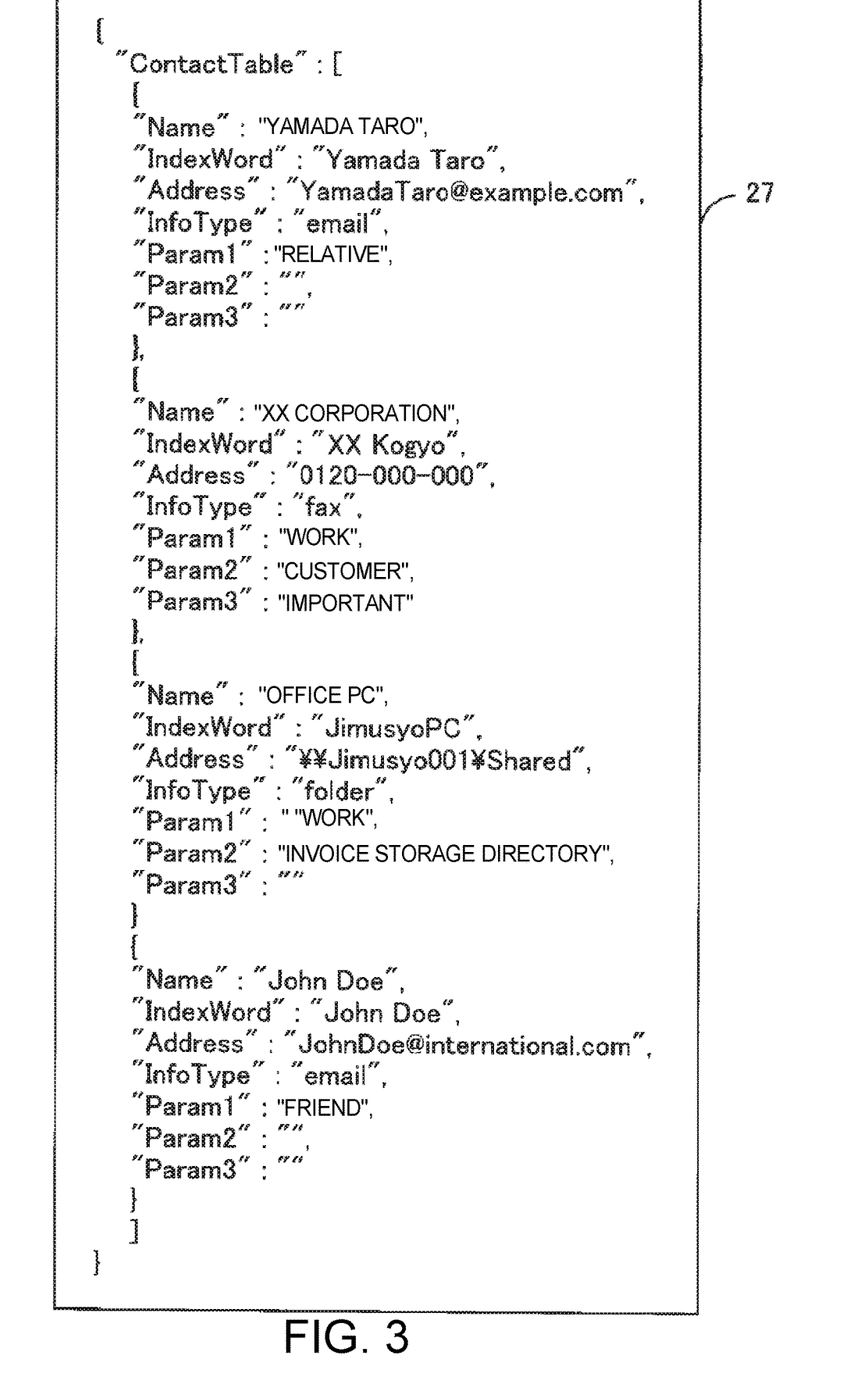
FIG. 3 shows an example of part of a database.

FIG. 3 shows an example of part of a database 27. FIG. 3 shows the database 27 in a text-based format. In the example in FIG. 3, each address entry includes the Name, Address, and other attributes of the addressee (contact). The database 27 may contain, for example, information about several thousand or more contacts.

In step S130, the device 20 acquires the database 27 in segments by the data acquisition unit 12*a* communicating through the communication interface 15 using the first communication protocol. For example, if the first communication protocol is SNMP, data is transmitted repeatedly in units of a relatively small size of 255 bytes or less between the device management device 10 and device 20. As a result, the data acquisition unit 12*a* receives part of the information in the database 27 sequentially in packets from the device 20 until the entire database 27 has been received.

In steps S120 and S130, the data acquisition unit 12*a* acquires database 27 state information in addition to the database 27. Database 27 state information is information indicating whether or not a particular block (field) of information (such as the Address) registered in the database 27 is locked. For example, if the address book database 27 contains 2000 addresses, the database 27 state information indicates, for each of the 2000 addresses, whether a particular address is locked. The database 27 state information is also part of the device management information 28 (MIB).

When an address is set as the transmission destination of the data transmission function of the device 20, that address is said to be locked.

For example, suppose the device 20 has an automatic fax relay function. When the fax communicator 25*d* receives a fax signal from an external device and an e-mail address was previously set as the destination, the mail communicator 25*c* uses the automatic fax relay function to automatically send the received content to that e-mail address. When the fax communicator 25*d* receives a fax signal from an external device and a fax number was previously set as the destination, the mail communicator 25*c* uses the automatic fax relay function to automatically send the received content to that fax number.

In another example, the device 20 has an automatic scanned document relay function. The automatic scanned document relay function automatically sends image data generated when the scanner 25*b* scans a document to the folder previously set as the destination.

The e-mail address and fax number that may be previously set as the destination to render the automatic fax relay function, and the path to the folder previously set as the destination to render the automatic scanned document relay function, are examples of locked addresses.

In other words, when an address registered in the database 27 of the device 20 is set as the destination to which information is sent by the data transmission function of the device 20, information indicating that the address changed from the unlocked state to the locked state is written to the device management information 28 (MIB) as a type of database 27 state information. When an address registered in the database 27 of the device 20 is removed as the destination of the data transmission function of the device 20, information indicating that the address changed from the locked state to the unlocked state is written to the device management information 28 (MIB) as a type of database 27 state information.

Locked means that the value stored in that field cannot be changed. Acquiring the database 27 state information in steps S120 and S130 is done by the data acquisition unit 12*a* communicating with the device 20 through the communication interface 15 using the first communication protocol. Because the database 27 state information is part of the device management information 28 (MIB), the data acquisition unit 12*a* sequentially acquires required information (the database 27 state information) from the MIB in segments by communicating with the device 20 according to the first communication protocol.

After executing step S120 or step S130, the data acquisition unit 12a ends the database acquisition process. The data acquisition unit 12a stores the data acquired from the device 20 in step S120 or step S130 in a specific storage area of the device management device 10.

3. Database Editing Process

Figure 4:
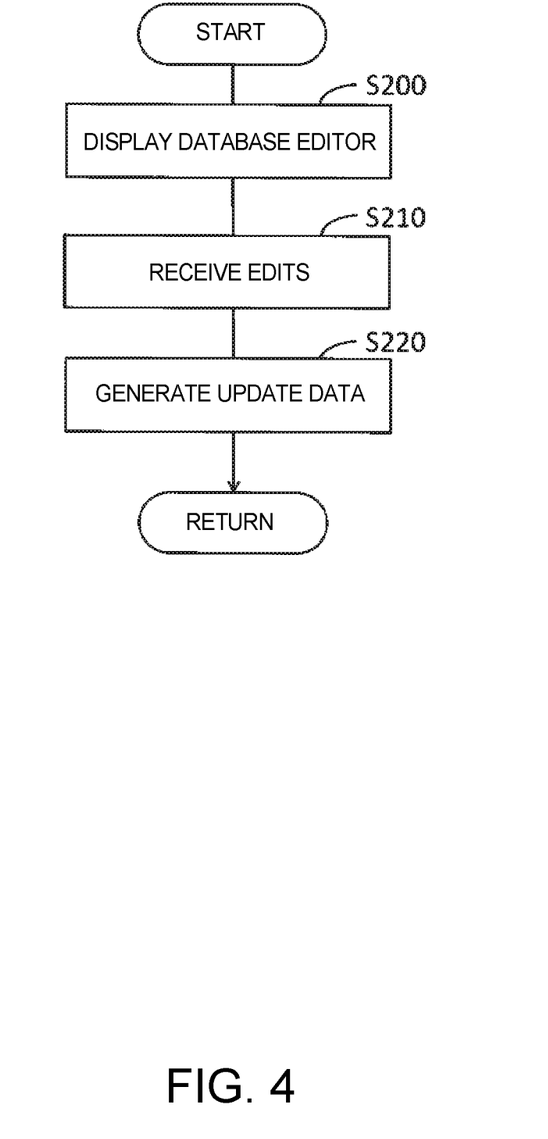
FIG. 4 is a flow chart of the database editing process.

FIG. 4 is a flow chart of the database editing process embodied by the controller 11 executing the management program 12. The database editing process is executed after the database acquisition process (FIG. 2).

In step S200, the controller 11 (update data generator 12b) displays on the display 13 an editor for editing the database 27 acquired in step S120 or S130 of the database acquisition process. The update data generator 12b in this example displays an editor presenting the content of the database 27 in a spreadsheet format. This editor is another type of user interface.

Next, the update data generator 12b receives edits of the database 27 (step S210). More specifically, the user inputs to the editor displayed on the display 13 by operating the operation input unit 14, and edits the content of the current database 27 as desired. However, the update data generator 12b does not accept edits of information in the database 27 that is locked (such as a locked address). Whether a particular address is locked can be determined based on the database 27 state information acquired as described above. For example, the update data generator 12b may disable input from the user by displaying the field containing a locked address grayed out in the editor on the display 13.

The update data generator 12b then generates update data according to the edits received in step S210 (step S220). In this example, the device management device 10 overwrites the database 27 currently stored with the edited content accepted in step S210. This generates an edited database 27, that is, update data. As a result, unlocked addresses (fax numbers or e-mail addresses, for example) may be changed in the database 27 stored by the device management device 10.

4. Database Updating Process

Figure 5:
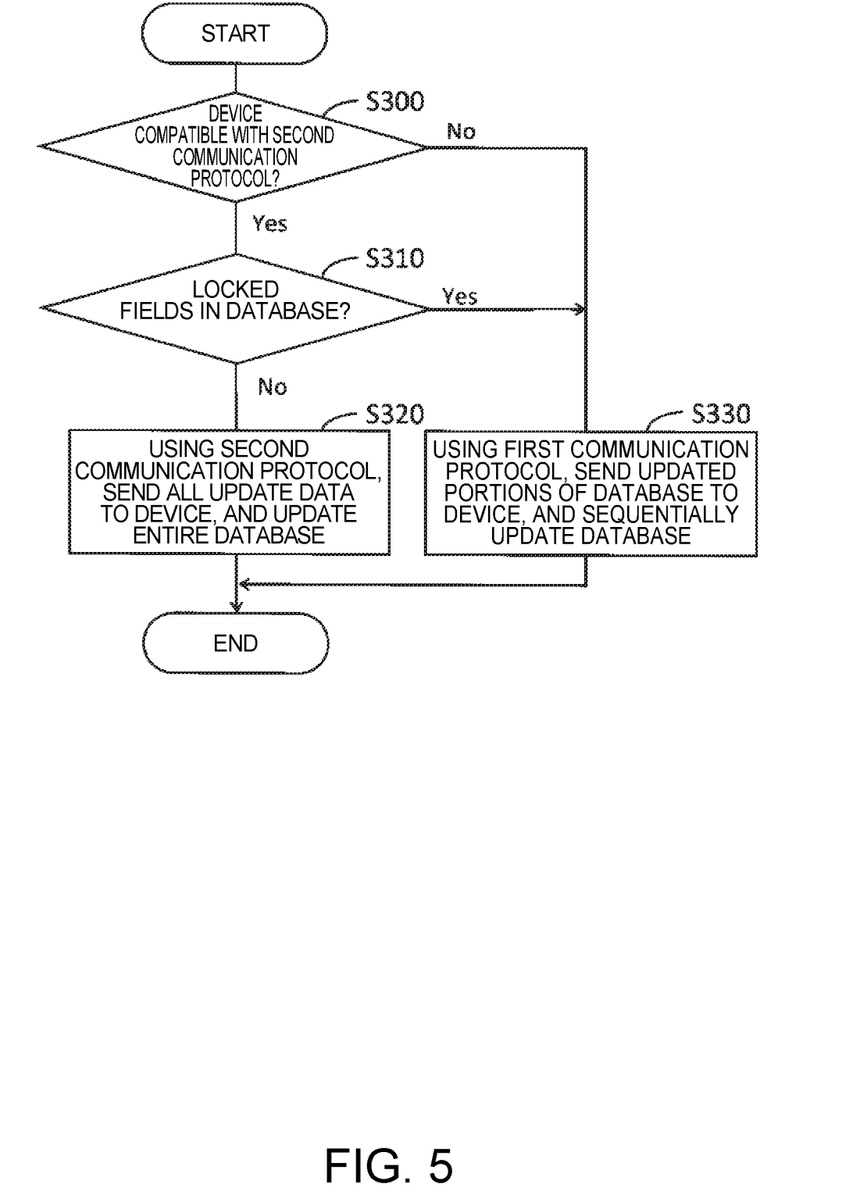
FIG. 5 is a flow chart of the database updating process.

FIG. 5 is a flow chart of the database updating process rendered by the controller 11 executing the management program 12. The database updating process is executed after the database editing process (FIG. 4).

In step S300, the controller 11 (database updater 12c), based on the communication support information already acquired in step S100 (FIG. 2), determines if the device 20 is compatible with the second communication protocol. The same operation performed in step S110 (FIG. 2) is performed in step S300. If the device 20 is compatible with the second communication protocol (step S300: Yes), the database updater 12c goes to step S310. If the device 20 is not compatible with the second communication protocol (step S300: No), the database updater 12c goes to step S330.

In step S310, the database updater 12c, based on the database 27 state information already acquired in step S120 or step S130 (FIG. 2), determines if there is at least one locked data field (address) in the database 27. If there is at least one locked data field (address) in the database 27 (step S310: Yes), the database updater 12c goes to step S330. If there is not at least one locked data field (address) in the database 27 (step S310: No), the database updater 12c goes to step S320.

In step S330, the database updater 12c, by communicating with the device 20 through the communication interface 15 using the first communication protocol, sequentially sends the updated data generated in step S220 (FIG. 4) one part at a time, that is sends part of the update data, to the device 20. Of the update data (edited database 27), the portion that was actually overwritten by the edits in step S210 is the part of the update data that is sent. By sequentially sending this part of the data to the device 20, the device 20 can update the database 27 in segments (update the parts of the database 27 that changed). Each time a block of data is sent from the device management device 10 by the first communication protocol is received, the device 20 updates (overwrites) that part of the database 27 stored by the device 20. Updating the database 27 by such data blocks is referred to as a first update.

Note that in the database editing process (FIG. 4), information that is locked in the database 27 cannot be edited. As a result, the updated portion of the edited data is edited data that is not locked in the database 27. Therefore, the first update, by sequentially sending parts of the edited data to the device 20, results in parts of the database 27 that are not locked on the device 20 being updated by the updated parts that are sent.

However, in step S320, the database updater 12c, by communicating with the device 20 through the communication interface 15 using the second communication protocol, sends all of the updated data generated in step S220 (FIG. 4) to the device 20 in a batch. By sending the updated data in a single batch to the device 20, the entire database 27 can be updated at once on the device 20. More specifically, the device 20 overwrites the database 27 stored on the device 20 with the updated data transmitted from the device management device 10 using the second communication protocol. Updating the entire database 27 by the updated data in this way is referred to as a second update. Note that even though the entire database 27 stored by the device 20 is overwritten, only those parts of the database 27 on the device 20 that correspond to the parts that were edited in the database editing process (FIG. 4) are actually changed.

5. Summary

In this embodiment of the invention, a device management device 10 that manages a device 20 having a database 27 comprises a data acquisition unit 12a that acquires database 27 state information from the device 20, and a database updater 12c that sends update data for updating the database 27 to the device 20, causing the database 27 to be updated according to the update data. The database updater 12c chooses whether to execute a first update (step S330) or a second update (step S320). In the first update (step S330), the database updater 12c sequentially sends to the device 20 the parts of the data that were updated based on the database 27 state information, causing the device 20 to update only the parts of the database 27 that were changed. In the second update (step S320), the database updater 12c sends the updated data to the device 20 in a single batch to update the entire database 27.

Therefore, when executing the second update is selected based on the state information, the updated data is transmitted in a single batch to refresh the entire database 27 using a high speed second communication protocol, and the database 27, which in many cases contains a large amount of data, can be updated quickly (in a short time).

In this embodiment, the database updater 12c determines based on the database 27 state information if one or more parts of the database 27 are locked (step S310). If at least part of the database 27 is locked (step S310: Yes), the database updater 12c updates the parts of the database 27 that are not locked by sending the changed parts of data in the first update process. If no part of the database 27 is locked (step S310: No), the second update is executed. When no part of the database 27 is locked, this configuration enables updating the database 27 quickly by executing the second update process (step S320). More specifically, the database 27 updating process can be executed quickly appropriately to the state of the database 27.

In the example described above, the database 27 is an address book storing numerous addresses for data transmission, and the address set as the destination to which data is sent by the data transmission function of the device 20 is the part (field) that is locked. When part of the database 27 is determined to be locked (step S310: Yes), even if the second update process is executed (step S320), there is the possibility of unexpected changes to addresses that should not be changed (such as the address set as the destination address of the data transmission function of the device 20) and the operation of the data transmission function becoming unreliable, but the embodiment described above can avoid destabilizing the operation of the data transmission function.

In the embodiment described above, the database updater 12c determines if the device 20 is compatible with a specific protocol (second communication protocol) used for communication in the second update process (step S300), and if the device 20 is compatible with the second communication protocol (step S300: Yes), selects executing the first update or second update process based on the database 27 state information (step S310). By determining if the device 20 is compatible with the second communication protocol before the selection based on the database 27 state information (step S310), making an unnecessary selection based on the database 27 state information (step S310) can be prevented.

In this embodiment of the invention the device management device 10 has an update data generator 12b that generates update data; the data acquisition unit 12a acquires a database 27 from the device 20 (FIG. 1); and the update data generator 12b displays the acquired database 27 in a specific window (editor), receives edits to the database 27, and generates update data based on the accepted edits (FIG. 4). Thus comprised, user edits of the database 27 can be easily accepted, and the accepted edits can be reflected in changes to the database 27.

6. Other Embodiments

The invention is not limited to the foregoing embodiments, and can be varied in many ways as described below.

When receiving edits of the database 27 through the editor (step S210), the update data generator 12b does not accept edits of areas (locked areas) of the database 27 that are determined to be locked based on the database 27 state information. However, the update data generator 12b may store edited content of these locked areas without reflecting the changes in the update data generated in step S220. After the edit is stored, the data acquisition unit 12a executes the database acquisition process (FIG. 2) again, and acquires new state information from the device 20. If a part of the database 27 that was previously locked is determined to have been unlocked based on the new database 27 state information acquired from the device 20, the update data generator 12b reports externally (to the user) that edited content for that locked area is stored (the area corresponding to the area previously locked in the database 27).

Reporting to the user may be done by displaying a specific message in the editor, or reporting by audio output from a speaker (not shown) of the device management device 10, for example. When the user acknowledges the report, the user can view through the editor the edited content that is currently stored by the device management device 10 and was not accepted during the previous edit of the database 27, and input the edited content to the current editor screen. As a result, the user can reflect content that was not reflected in the update data during the previous edit of the database 27 in the data that is updated during the current database 27 editing process.

The first communication protocol and second communication protocol are not limited to the specific examples described above (SNMP, HTTP). For example, the second communication protocol may be by HTTPS (Hyper Text Transfer Protocol Secure), or another protocol suitable for high speed transmission of a large amount of data.

If in the database update process (FIG. 5) the database updater 12c determines Yes in step S300 and Yes in step S310, a third option that is not step S320 or step S330 may be executed. In this third option, the database updater 12c, by communicating through the communication interface 15 using the second communication protocol, sends all of the update data generated in step S220 (FIG. 4) to the device 20. The device 20 that receives the updates database may then overwrite, based on the changed parts of the update data, the parts of the database 27 stored by the device 20 that were changed (while avoiding changing locked portions). This combination of batch transmission of the update data to the device 20, and partially updating the database 27 stored on the device 20 based on the changed portions, may be referred to as a third update.

In the embodiment described above a controller 11 having a CPU, ROM, and RAM embodies functions including the data acquisition unit 12a, update data generator 12b, and database updater 12c in software by running the management program 12, but some of these functions may be embodied in hardware.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2016-180753, filed Sep. 15, 2016, is expressly incorporated by reference herein.

What is claimed is:

1. A device management device that manages a device having a database, comprising:
an acquisition unit configured to acquire database state information from the device, the database state information indicating whether a portion of the database is locked; and
an updating unit configured to send update data for updating the database to the device, and cause the device to update the database based on the update data,
the updating unit selectively executing, based on the database state information, a first updating process of sequentially sending a first portion and a second portion of the update data to the device to change one or more updated portions of the database, or a second updating process of sending all of the update data to the device to refresh the complete database.

2. The device management device described in claim 1, wherein:
the updating unit determines, based on the database state information, if at least one field of the database is locked,
executes the first updating process to change fields of the database that are not locked based on the updated portions if at least one field of the database is locked, and
executes the second updating process if no field of the database is locked.

3. The device management device described in claim 2, wherein:
the database is an address book containing multiple addresses of data transmission destinations, and the address set as the destination of the data transmission function of the device is the locked field of the database.

4. The device management device described in claim 1, wherein:
the updating unit determines if the device is compatible with a specific protocol used for transmission for the second updating process, and if the device is compatible with the specific protocol, selects executing the first updating process or second updating process based on the database state information.

5. The device management device described in claim 1, wherein:
the updating unit uses SNMP (Simple Network Management Protocol) for communication for the first updating process, and uses HTTP (Hyper Text Transfer Protocol) for communication for the second updating process.

6. The device management device described in claim 1, further comprising:
an update data generator configured to generate the update data;
the acquisition unit acquiring the database from the device; and
the update data generator displaying the acquired database in a specific screen, receiving edits of the database, and generating the update data according to the received edits.

7. The device management device described in claim 6, wherein:
the update data generator stores, without reflecting in the update data, the content of edits of a locked field, which is the portion of the database determined to be locked based on the database state information; and
when a locked field of the database is determined to have been unlocked based on new database state information acquired by the acquisition unit from the device after edited content was stored, externally reporting that edited content of the locked field is stored.

8. A computer-readable, non-transitory recording medium storing a device management program enabling a computer to manage a device having a database, the device management program comprising:
an acquisition function of acquiring database state information from the device, the database state information indicating whether a portion of the database is locked; and
an updating function of sending update data for updating the database to the device, and causing the device to update the database based on the update data,
the updating function selectively executing, based on the database state information, a first updating process of sequentially sending a first portion and a second portion of the update data to the device to change one or more updated portions of the database, or
a second updating process of sending all of the update data to the device to refresh the complete database.

* * * * *